United States Patent [19]
Indes et al.

[11] Patent Number: 5,913,282
[45] Date of Patent: Jun. 22, 1999

[54] PET LITTER BOX

[76] Inventors: Maura B. Indes; Thomas E. Adam, both of P.O. Box 3195, Carefree, Ariz. 85377

[21] Appl. No.: 09/045,246

[22] Filed: Mar. 20, 1998

[51] Int. Cl.⁶ .................................................. A01K 29/00
[52] U.S. Cl. ............................................................. 119/168
[58] Field of Search ..................................... 119/165, 168

[56] References Cited

U.S. PATENT DOCUMENTS

| | | | |
|---|---|---|---|
| 5,014,649 | 5/1991 | Taft | 119/168 |
| 5,035,205 | 7/1991 | Schiller et al. | 119/168 |
| 5,094,188 | 3/1992 | Wolak | 119/168 |
| 5,117,781 | 6/1992 | Roach | 119/168 |
| 5,129,364 | 7/1992 | Pirkle | 119/168 |
| 5,167,205 | 12/1992 | Bell et al. | 119/168 |
| 5,203,282 | 4/1993 | Hasiuk | 119/168 |
| 5,211,134 | 5/1993 | Bolo, III | 119/168 |
| 5,337,700 | 8/1994 | Toft | 119/168 |
| 5,394,834 | 3/1995 | Queen et al. | 119/168 |
| 5,465,686 | 11/1995 | Monetti et al. | 119/168 |
| 5,488,929 | 2/1996 | Pierson et al. | 119/170 |
| 5,730,085 | 3/1998 | Santoiemmo | 119/168 |

*Primary Examiner*—Thomas Price
*Attorney, Agent, or Firm*—Halvorson & Venable, P.C.

[57] ABSTRACT

The device of the present invention is useful as a disposable litter box and comprised of a base flexibly attached to a cover and constructed from a single piece of biodegradable, lightweight construction material that either is, or is treated to be, moisture resistant. An object of the invention is to provide a collapsible, disposable pet litter box having a cover flexibly attached to a base and wherein the device of the present invention is capable of being manipulated, into an erect state, that allows access to the litter material held within the base, and into a collapsed state that caps the base and seals litter in the base.

3 Claims, 3 Drawing Sheets

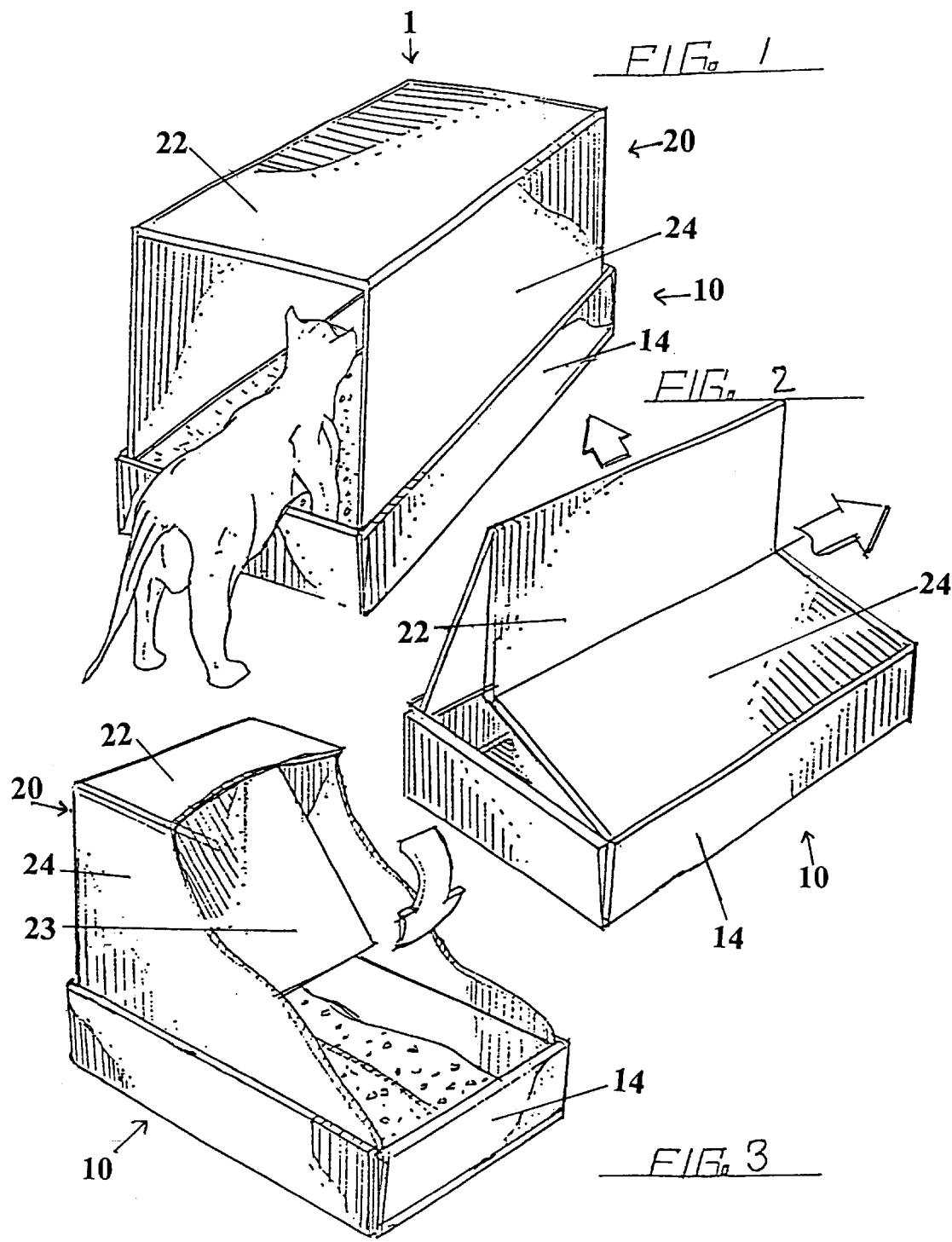

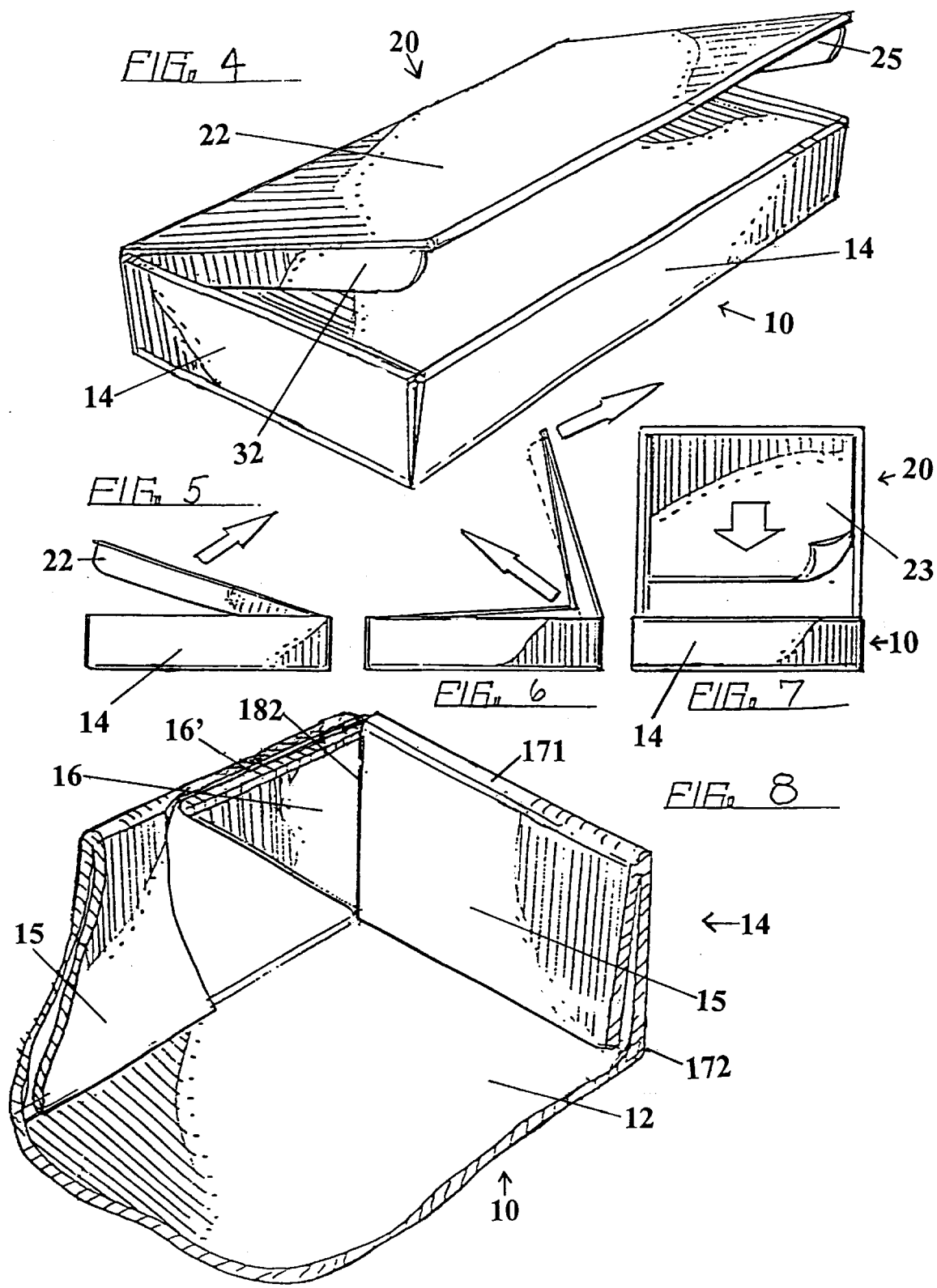

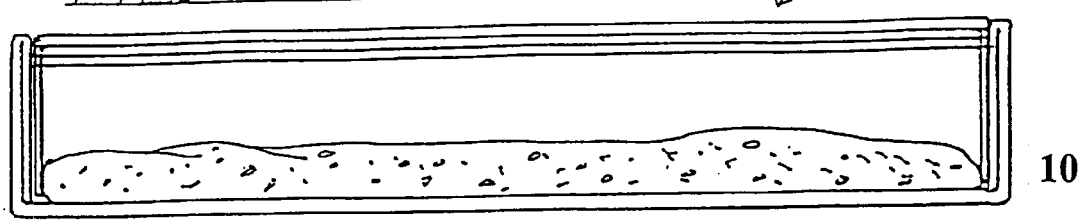
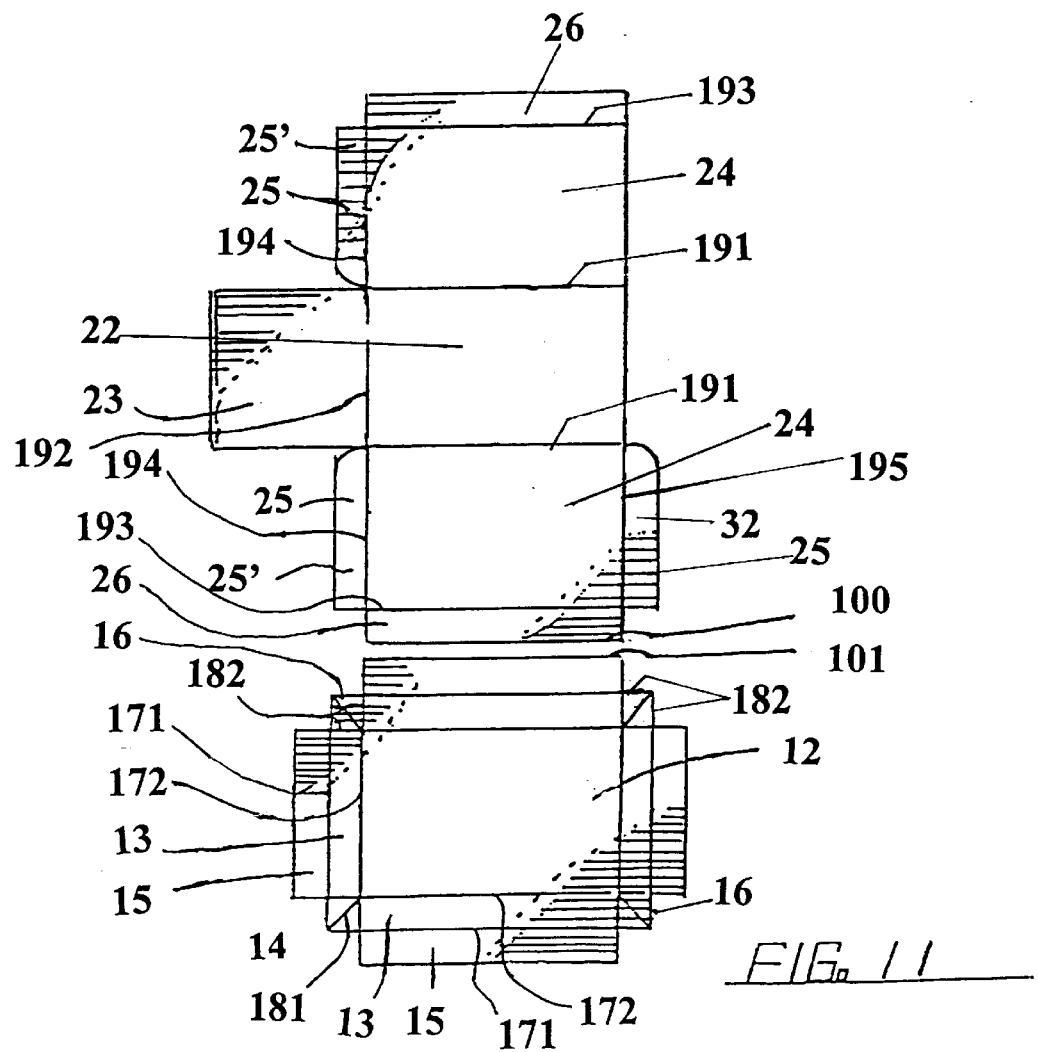

PET LITTER BOX

FIELD OF THE INVENTION

The present invention relates to the field of pet litter structures, commonly referred to as litter boxes. More particularly, the present invention relates to the field of disposable and collapsible pet litter boxes.

BACKGROUND

It is well known to provide a litter box as a commode for a pet. A standard litter box provides a sanitary solution to pet waste. Most commonly, the standard litter box is an open top box constructed of hard plastic to provide resiliency and permanency. Litter material, typically in the form of clay pellets, is then placed within the standard litter box to absorb the moisture and odor related to pet waste.

Unfortunately, the standard litter box is not particularly accommodating to transient requirements. Temporary problems might arise when one is vacationing or traveling. However, the hardness and resiliency of the standard litter box make transport more difficult than necessary. Furthermore, should a temporary solution be desired, disposal of the standard litter box would be wasteful. Rather than packing-up the standard litter box, it would instead be better to provide a disposable litter box.

Ideally, the disposable litter box should be inexpensively manufactured and the required assembly should be minimal and simple. Also, the disposable litter box should be sufficiently strong to withstand packing, shipping and stacking. Furthermore, the structure of the disposable litter box must be resistant to repeated moisture exposure.

A review of the prior art reveals inventions related to disposable litter boxes. For example, U.S. Pat. No. 5,014,649 issued to Taft ("Taft") discloses a disposable pet litter box having an accordion like structure made from cardboard. The Taft structure is particularly easy to assemble in that all that is required is to lift off a top portion of a box, and pull vertically on an accordion structure to erect the litter box.

Other examples of disposable pet litter boxes are disclosed in U.S. Pat. No. 5,035,205 issued to Schiller et al. ("Schiller"), and U.S. Pat. No. 5,394,834 issued to Queen et al. ("Queen"). The Schiller and Queen patents are more utilitarian in design. Both of these patents disclose collapsible and disposable enclosures for pet litter. In these designs the emphasis is on simplicity. The Schiller design is a box comprised of scored foldable panels that are manipulated to form the housing structure. The Queen design features a minimum of rigid panels and a peel-back cover to access the charge of cat litter. Nonetheless, these designs are somewhat complex to assemble. Thus, there is a present and continuing need for development and improvement in the field of disposable litter boxes.

SUMMARY OF THE INVENTION

It is an object of the present invention to provide a collapsible, disposable pet litter box.

It is another object of the present invention to provide a collapsible, disposable pet litter box having a cover flexibly attached to a base and wherein the device of the present invention is capable of being manipulated, into an erect state that allows access to the litter material held within the base, and into a collapsed state that caps the base and seals litter in the base.

It is a further object to construct the present invention from a single piece of construction material.

It is another object of the present invention to provide fold-guides on the construction material so as to facilitate flexure into the erect and collapsed conditions.

It is a further object of the present invention to provide a temporary and disposable pet commode kit by including the device of the present invention and a charge of litter held within the base.

BRIEF DESCRIPTION OF THE DRAWINGS

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings wherein:

FIG. 1 depicts a perspective view of the present invention in the erect state being entered by a cat;

FIG. 2 depicts a perspective view illustrating the flexure of the cover of the present invention;

FIG. 3 depicts a cut away perspective view showing the back panel folding downward;

FIG. 4 depicts a perspective view of the present invention with the cover substantially collapsed to cap the base portion;

FIG. 5 depicts the first of three side views illustrating the manipulation of the cover to achieve the erect condition of the present invention;

FIG. 6 depicts the second of three side views illustrating the manipulation of the cover to achieve the erect condition of the present invention;

FIG. 7 depicts the third of three side views illustrating the manipulation of the cover to achieve the erect condition of the present invention;

FIG. 8 depicts a cut away perspective view of the floor, two walls, and one of the corner pads of the base;

FIG. 9 depicts a cut away side view showing litter material in the base;

FIG. 10 depicts a cut away side view of the floor of the base;

FIG. 11 depicts an unassembled top view of the present invention.

DESCRIPTION OF PREFERRED EMBODIMENTS

The device 1 of the present invention is more fully defined and described with reference to the drawings. Referring to FIG. 1, the device of the present invention is, generally, useful as a disposable litter box and comprised of a base 10 flexibly attached to a cover 20 and preferably constructed from a single piece of biodegradable, lightweight construction material that either is, or is treated to be, moisture resistant. Alternatively, it is also possible to construct the base 10 and the cover 20 to be flexibly and removably attachable by using two or more pieces of the construction material.

Although it is conceivable that other materials could also be used to construct the base 10 and cover 20, due primarily to availability and cost, treated cardboard is the preferred construction material for the present invention. FIG. 12 depicts a cut-away side view of the base 10 of the present invention whereby a wax coating 110 is used over cardboard 100.

The single piece of construction material is ideally semi-rigid and creased or deformed along appropriate lines to form fold-guides, denoted 171, 172, 181, 182, 191, 192, 193 and 194. The fold-guides facilitate flexure of the device 1 into either an erect or a collapsed state. The fold-guides 171, 172, 181, 182, 191, 192, 193 and 194 could also be replaced or accompanied by lines printed on the construction material to indicate where folds should be placed to construct the cover 20 and the base 10.

The base 10 holds the litter material and waste and provides a structural foundation for the cover 20. The cover 20 provides shelter, but allows access to the litter in the base 10 when cover 20 is in the erect state. Furthermore, the cover 20 is also used to "cap" or seal the base 10 and prevent the spillage of waste and litter material when the cover 20 is in the collapsed state.

A preferred construction of the base 10 of the device 1 further comprises a substantially rectangular floor 12, four substantially rectangular walls 14 having primary and secondary base fold-guides, 171 and 172 respectively, and four corner pads 16, having primary and secondary corner pad fold-guides, 181 and 182 respectively, folded into the form of a box. The floor 12 of the preferred embodiment is connected to the four walls 14 and has relative dimensions of one foot wide by two feet long. Generally the dimensions should be sufficient to allow an average size cat access to the litter held in the base 10.

Each of the walls 14 is approximately three inches in height. Generally, three inches is enough to reduce the spillage of litter when the cat is pawing the litter material to cover it's waste. Finally, it may be desirable to use a heavier material for the base 10 20 than for the cover 20, as it will bear most of the weight and moisture of the litter and waste. FIG. 11 depicts an embodiment of the present invention whereby the cover 20 and the base 10 are cut and separated by adjacent edges 100 and 101. An alternate embodiment featuring single-piece construction of the present invention would have the cover 20 and the base 10 joined along the edges 101 and 100.

Each of the walls 14 of the base 10 are further comprised of a first section 13 and a second section 15. The first section 13 and the second section 15 of each of the walls 14 are halves of each wall 14, folded lengthwise along the primary base fold-guide 171 in an inward direction relative to the floor 12 of the base 10. Additionally, the combination of the first section 13 and the second section 15 are folded inward along the secondary base fold-guide 172. Folding the walls 14 in this manner effectively doubles the thickness of the material in the wall 14 and increases the structural integrity of each of the walls 14.

The four corner pads 16 extend from each corner of the floor 12 and connect at common edges to the adjacent first sections 13 of the walls 14 along the eight secondary corner pad fold guides 182. The secondary corner pad fold-guides 182 exist along each edge common to the four adjacent first sections 13 and facilitate the inward flexure of the corner pads 16 when folded inward along the primary corner pad fold-guides 181 that bisect each corner pad 16 diagonally. Folding the corner pads 16 in the manner described will result in a triangular wedge in each corner of the base 10. One such corner is depicted in FIG. 8. The corner pads 16 provide a continuous litter and waste resistant wall, extending up from the floor 12 of the device 1 and also function as slots 16' to be used by tabs 25' on the cover 20.

The cover 20 of the preferred embodiment is comprised of a substantially rectangular top panel 22, a substantially rectangular back panel 23, two substantially rectangular side panels 24, one front tab 32, two attachment panels 26, two side panel fold-guides 191, a back panel fold-guide 192, and two attachment panel fold-guides 193, two back panel brace fold-guides 194 and one front tab fold-guide 195.

The cover 20 also has two components having dual functions. The components function as back tabs, denoted as 25', when the device 1 is in the collapsed condition, and function as back panel braces, denoted as 25, when the device 1 is in the collapsed condition.

Each side panel 24 is flexibly connected, along one of the side panel fold-guides 191, at a common edge with the rectangular top panel 22. The two side panels 24 brace the top panel 22 and also provide side shelter for the base 10 when the litter box is in the erect state. At distal edges from where each side panel 24 attaches to the top panel 22, the side panels 24 are flexibly connected along the attachment panel fold-guides 193 to the two attachment panels 26 which, in one embodiment, are flexibly attached to the walls 14 of the base 10 along a common edge created by an un-illustrated fold-guide. This attachment scheme results in a structure that is particularly easy to erect and collapse. FIG. 5–7 depict a series of front views of the device 1 with the arrows showing the flexure of the panel fold-guides 191, 192, 193 and 194 along the common edges of the panels, 22, 23, and 24, of the cover 20 during manipulation of the device 1 into the erect state.

The back panel 23 is flexibly connected at the back panel fold-guide 192, along one common edge of the top panel 22. The back panel braces 25 are substantially rectangular extensions of the back edge of each side panel 24 that are folded lengthwise along each of the two back panel brace fold-guides 194 to a substantially right angle with respect to the side panels 24. The front tab 32 is connected to one side panel 24 along a common edge created by the front tab fold-guide 195.at an edge distal to one of the back panel braces 25

To maintain the device 1 in the erect state, the back panel 23 is folded downward until it comes into contact with the back panel braces 25. In this orientation, the back panel 23 provides a right angle brace for the top panel 22 and the two side panels 24.

To maintain the device 1 in the collapsed state, the front tab 32 and the two back tabs 25' are wedged into the slots 16' created by the corner pads 16. Thereafter, friction between the front tab 32 and back tabs 25' and the corner pads 16 secure the cover 20 in the collapsed condition. FIG. 8 depicts the manner of folding the corner pads 16 and the second sections 15 of the walls 14 to create the slots 16' of the base 10.

While these descriptions directly describe the above embodiments, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A device for the disposal of pet litter comprising;
   a. a cover comprising,
      i. a first side panel flexibly attached along a first side panel fold-guide to a top panel, a second side panel is flexibly attached to the top panel along a second side panel fold-guide at an edge opposite from where the first side panel attaches, the top panel is further flexibly attached to a back panel at a third edge along a back panel fold-guide, the first and the second side panels also flexibly attach to a first attachment panel and a second attachment panel along first and second attachment panel fold-guides, the first and second side panels further flexibly attach to a two back panel braces along two back panel brace fold-guides, and the first of said side panels is further yet flexibly connected to a front tab along a front tab fold-guide; and, b. a base comprising,
   a substantially rectangular floor flexibly connected along four secondary base fold-guides to first sections, further the first sections are flexibly connected along four primary fold-guides to second sections, the first sections are further connected to four corner pads along eight secondary corner pad fold-guides, and the four corner pads are each bisected diagonally by four primary corner pad fold-guides; and, c. said base is further flexibly attachable to the cover along one edge common to at least one second section of the base and at least one attachment panel of the cover.

2. A device for the disposal of pet litter comprising;

a. a substantially rectangular top panel flexibly attached to two substantially rectangular side panels along two side panel fold-guides, a substantially rectangular back panel flexibly attached to said substantially rectangular top panel along a back panel fold-guide, two attachment panels, flexibly attached along two attachment panel fold-guides to said substantially rectangular side panels, said substantially rectangular side panels being further flexibly attached to, two back panel braces along two back panel brace fold-guides, one of said substantially rectangular side panels being flexibly connected to a front tab along a front tab fold-guide, and b. a substantially rectangular floor flexibly connected along four secondary base fold-guides to first sections of four substantially rectangular walls having first and second sections, said first sections also being flexibly connected along four primary base fold-guides to the second sections, said first sections being further connected to said four primary corner pads along the eight secondary corner pad fold-guides, and said four primary corner pads being bisected diagonally by said four primary corner pad fold-guides, and c. at least one of the attachment panels is flexibly attached along one edge of at least one of the second sections.

3. A method of making a device for the disposal of pet litter comprising the steps of;

a. making a cover by;
   i. folding a first side panel, that is flexibly attached to a top panel, along a first side panel fold guide; and,
   ii. folding a second side panel, that is flexibly attached to the top panel, along a second side panel fold-guide at an edge opposite from where the first side panel is attached; and,
   iii. folding a back panel, that is flexibly attached to the top panel, at a third edge along a back panel fold-guide; and,
   iv. folding first and second attachment panels, that are flexibly attached to the side panels, along the first and second attachment panel fold-guides; and,
   v. folding to a right angle two back panel braces, that are flexibly attached to the side panels, along the two back panel brace fold-guides; and,
   vi. folding to a right angle a front tab that is flexibly attached to one of the side along a front tab fold-guide; and, b. making a base by;
   i. folding four first sections, that are flexibly attached to a floor, inward relative to the floor along four secondary base fold-guides; and,
   ii. folding four second sections, that are flexibly attached to the four first sections, inward relative to the floor, along four primary fold-guides; and,
   iii. folding four corner pads, that are flexibly attached to four corner pads along eight secondary corner pad fold-guides, each along four primary corner pad fold-guides that bisect each corner pad diagonally, wherein the device can be manipulated into an erect condition, so that the cover shelters the base and litter held therein, into a collapsed condition, so that the cover seals the base and the litter held therein.

* * * * *